(12) United States Patent
Snyder

(10) Patent No.: US 6,483,511 B1
(45) Date of Patent: Nov. 19, 2002

(54) EVENT SIMULATOR, AND METHODS OF CONSTRUCTING AND UTILIZING SAME

(76) Inventor: Richard D. Snyder, 9223 Sandhill Ct., Saline, MI (US) 48176

( * ) Notice: Subject to any disclaimer, the term of this patent is extended or adjusted under 35 U.S.C. 154(b) by 0 days.

(21) Appl. No.: 09/224,038

(22) Filed: Dec. 31, 1998

Related U.S. Application Data

(60) Provisional application No. 60/070,108, filed on Dec. 31, 1997.

(51) Int. Cl.[7] .............................................. G06F 15/00
(52) U.S. Cl. ...................................................... 345/473
(58) Field of Search ................................ 345/473, 474, 345/475, 419, 433; 382/118, 224

(56) References Cited

U.S. PATENT DOCUMENTS

| | | | |
|---|---|---|---|
| 5,936,774 A | * | 7/2000 | Street .......................... 359/830 |
| 6,088,040 A | * | 7/2000 | Oda et al. ..................... 345/473 |
| 6,124,862 A | | 9/2000 | Boyken, et al. .............. 345/435 |
| 6,175,343 B1 | | 1/2001 | Mitchell, et al. ................ 345/8 |

* cited by examiner

*Primary Examiner*—Phu K. Nguyen
(74) *Attorney, Agent, or Firm*—William F. Esser

(57) ABSTRACT

An event simulator which captures a live or recorded event and selectively incorporates simulator participants therewith. The simulator includes a mechanism for generating a computer graphic representation of an environment in which real events occur; a mechanism for determining the position and orientation of one or more movable objects, such as race cars, in the environment; a mechanism for generating a computer graphic representation of the one or more movable objects in the computer graphic representation of the environment based upon the position and orientation of the one or more movable objects at predetermined time intervals as provided by the position determining mechanism; an interface mechanism for providing data from zero or more simulator participants; a mechanism for generating a computer graphic representation of zero or more participants in the computer graphic representation of the environment in response to participant-supplied data from the interface mechanism; and a mechanism for displaying the computer graphic representation of the environment based upon the position determining mechanism for the one or more movable objects, the computer representation generating mechanism for the one of more movable objects and the computer representation generating mechanism for the zero or more participants.

35 Claims, 2 Drawing Sheets

EVENT SIMULATOR, AND METHODS OF CONSTRUCTING AND UTILIZING SAME

This application claim benefit to Provisional Application 60/070,108 filed Dec. 11, 1997.

BACKGROUND OF THE INVENTION

1. Field of Invention

This invention relates to an event simulator, and in particular to a system which captures live or recorded events, generates a computer image of the captured events, selectively incorporates simulator participants therewith and outputs the computer image to simulator participants and/or viewers.

2. The Relevant Art

There are known vehicle simulators. For instance, Barstow U.S. Pat. No. 5,526,479 discloses a system which produces a computer-coded description of a live event and broadcasts a cryptic computer simulation of the live event The above-identified reference, however, fails to disclose a system which incorporates one or more simulator participants with live or recorded events in an interactive environment using computer graphics.

SUMMARY OF THE INVENTION

The present invention overcomes the above-discussed limitations and shortcomings of known simulators and satisfies a significant need for a simulator which provides a computer graphics representation of a series of actual, real-world events with which the participant may engage in a substantially life-like manner. In one preferred embodiment of the present invention, the actual events comprise an automobile race and the simulator system allows simulator users to participate in the computer simulation of the actual race.

According to a preferred embodiment of the present invention, there is provided an event simulator, such as an automobile race simulator, comprising a means for generating a computer graphic representation of an environment in which real events occur; a means for detecting the position and orientation of one or more movable objects, such as race cars, in the environment; a means for selectively generating a computer graphic representation of the one or more movable objects in the computer graphic representation of the environment based upon the position and orientation of the one or more movable objects at predetermined time intervals as recorded by the position detecting means; interface means for providing data from zero or more participants; a means for generating a computer graphic representation of zero or more participants in the computer graphic representation of the environment in response to participant-supplied data from the interface means; and a means for displaying the computer graphic representation of the environment based upon the position detecting means for the one or more movable objects, the computer representation generating means for the one of more movable objects and the computer representation generating means for the zero or more participants.

A process for simulating an actual event may comprise the steps of generating a computer representation of a real-world environment; generating a computer representation of the one or more movable objects in the computer representation of the environment; generating a computer representation of the zero or more participants; displaying the computer representation of the environment having the initial position and orientation of the one or more movable objects and the zero or more participants therein; sequentially updating the display of the computer representation of the environment every predetermined time interval; and ending the simulation upon completion of the event.

It is an object of the present invention to provide a computer simulation of an actual event in which one or more users may participate in the simulated event.

Another object of the present invention is to provide a simulation system in which a live event is captured and represented graphically in real time so that users may participate in the simulated event as the live event is occurring.

Still another object of the present invention is to provide a simulation system in which a recorded event is captured, stored and graphically represented for subsequent simulation for participation by system users.

It is another object of the present invention to provide such a simulation system in which parameters of the captured actual event are alterable to accommodate a variety of participant skill levels.

Another object of the present invention is to provide a simulation system which allows viewers and/or simulator participants substantially unlimited views of a simulation of an actual event.

Other objects, advantages, and salient features of the present invention will become apparent from the following detailed description, which, when taken in conjunction with the annexed drawings, discloses the preferred embodiments of the present invention.

DETAILED DESCRIPTION OF THE PREFERRED EMBODIMENTS

Figure 1:
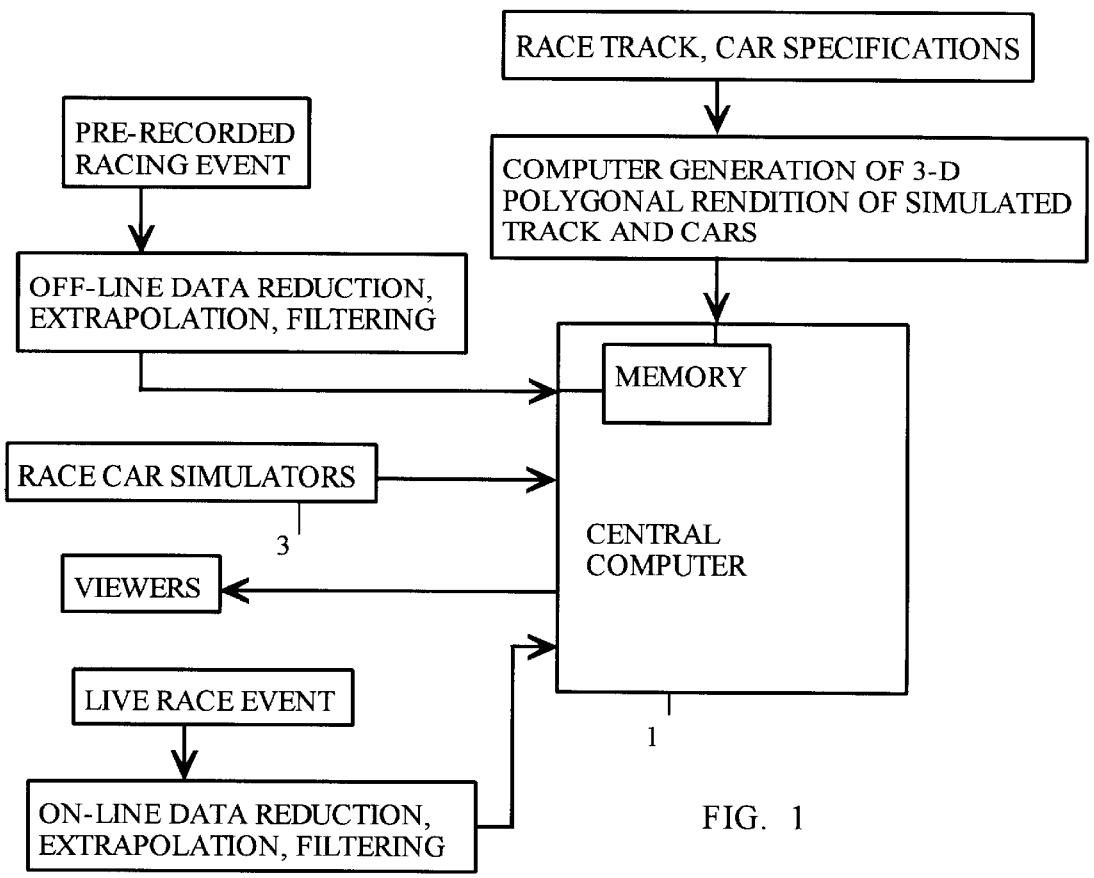
FIG. 1 is a block diagram of a preferred embodiment of the present invention.
Figure 2:
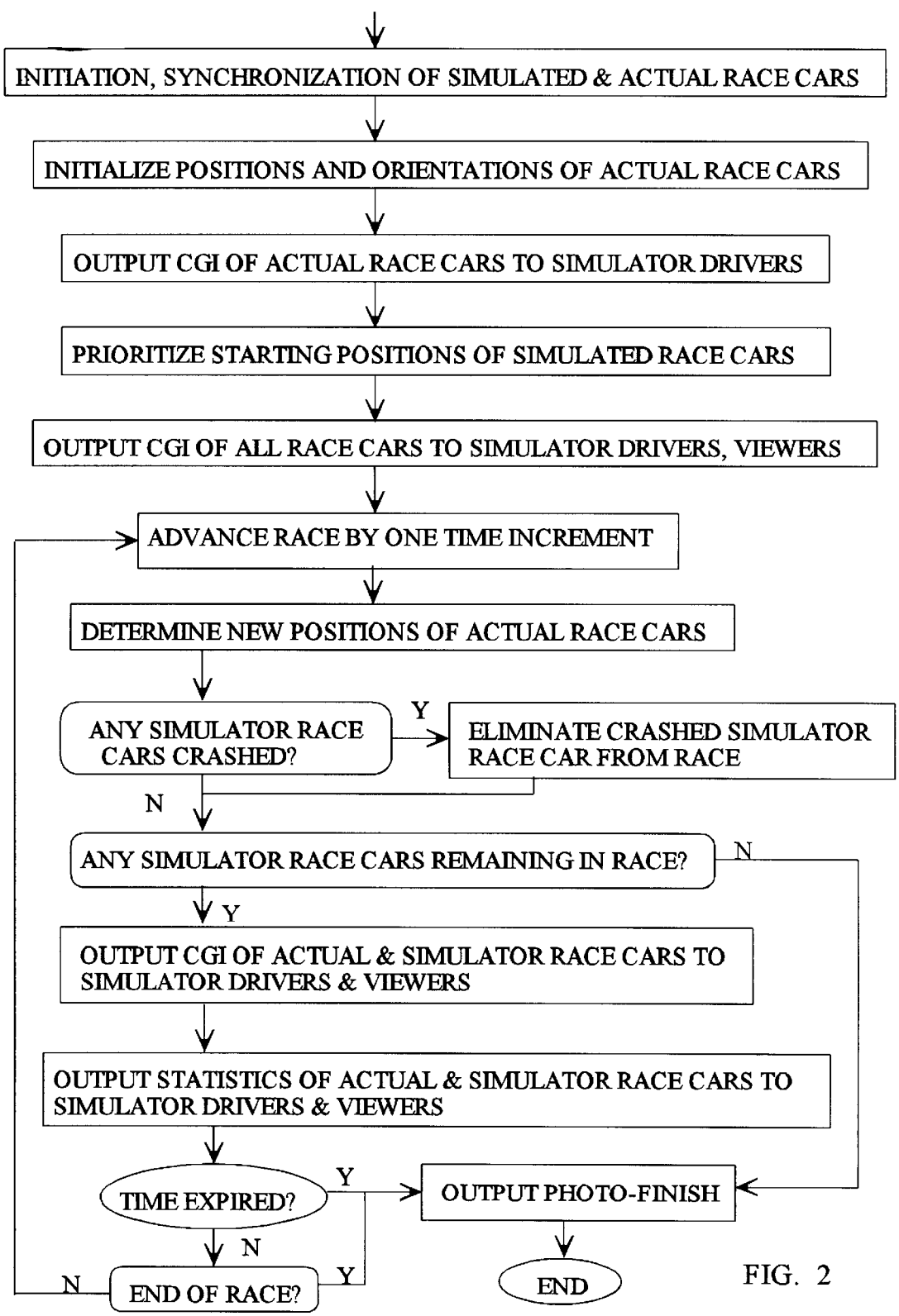
FIG. 2 is a flow chart for an algorithm used by the central computer of the preferred embodiment of the present invention.

Referring to FIGS. 1 and 2, there is disclosed an event simulator according to the present invention, comprising a means for generating a computer graphic representation of an environment in which a series of actual events occur; a means for detecting a position and orientation of one or more movable objects in the environment; a means for generating a computer graphic representation of the one or more movable objects appearing in the environment at predetermined time intervals; interface means for providing participant-supplied data representing movement of at least one participant in the computer representation of the environment; and central computing means for presenting a graphical representation of the event based upon data from the environment generating means, the movable object generating means, the position detecting means and the interface means.

Although the present invention is applicable to simulate participant involvement in virtually any actual spectator event, the present invention will be described within the context of automobile racing for exemplary purposes. In this scenario, the environment comprises an actual race track and the movable objects comprise actual race cars appearing on the race track during an automobile race.

Accordingly, the means for generating a computer graphic representation of the environment generates a digital representation of an actual automobile race track. As shown in FIG. 1, the environment generating means preferably but not necessarily receives specification data pertaining to an automobile race and generates a 3-D polygonal rendition of the actual race track and each actual race car appearing in the automobile race. The environment generating means preferably generates the graphic representation m an off-line manner prior to the simulation of the actual race. After the graphical representation of the actual race track and race cars is complete, the data is available as input to central computer 1.

In a first preferred embodiment of the present invention, the simulator system captures a previously recorded automobile race and integrates the captured race with computer simulator participants. In this embodiment, the means for detecting the positions and orientations of the movable objects may preferably comprise any of a number of mechanisms which monitor vehicular position and orientation. For example, the detecting means may comprise "scouts" which chart race cars throughout the course of the race, videotape equipment, GPS devices, on-board computers/sensing equipment, or low altitude radar. As shown in FIG. 1, the position detecting means provides data to the means for generating a computer graphic representation of the race cars.

According to the first preferred embodiment of the present invention, the means for generating a computer graphic representation of the actual race cars in the simulated environment places the positioning and orientation of each actual race car at every predetermined time interval throughout the race according to input data. In order to provide a substantially accurate simulation of the actual race, the race car positioning means preferably determines the three dimensional spatial coordinates of each actual race car as well as its orientation relative to the simulated race track. Orientation information may include yaw, pitch and roll data. The frequency at which the race car positioning and orientation determinations are made is optimally greater than approximately 15 Hz. The race car positioning means preferably performs data reduction, extrapolation and filtering to provide the position and orientation data for each actual race car at each time interval. Because these determinations may be made off-line in advance of the simulation, the resulting data is preferably stored in memory within central computer 1.

In a second preferred embodiment of the present invention, the simulator system captures a live automobile race and integrates the captured race with computer simulated participants in real time. In this way, the simulator participants experience the feel of the live race. Although the data reduction, extrapolation and filtering operations performed in this embodiment are substantially the same as in the first preferred embodiment, the means for detecting the position and orientation of the actual race cars preferably comprises mechanisms having sufficient bandwidth to perform the position and orientation determinations in an on-line, real time manner. For example, the detecting means may include on-board sensing devices or radar. As shown in FIG. 1, the captured data is preferably fed directly to central computer 1 for processing instead of first being stored in computer memory.

The present invention preferably includes interface means for providing participant-supplied data representing movement of zero or more participants in the simulated environment. The interface means may preferably comprise one or more driving stations 3, each of which emulates a compartment of the type of vehicle that is featured in the actual race.

Each driving station 3 may include a driver's seat, dashboard having gauges and other instrumentation, and input control devices which simulate the controls of the vehicle, such as a steering wheel, accelerator, brake, clutch, gear shift, etc. As shown in FIG. 1, the input control devices are preferably electronically connected to central computer 1 for use thereby in integrating a participant-operated simulated vehicle into the computer representation of the actual race.

Central computer 1 preferably presents the simulation of the actual automobile race having therein the computer representations of the actual race cars and the simulated, participant-operated race cars. Central computer 1 preferably presents the automobile race to the participants and viewers of the simulation based upon data pertaining to the captured race track and race car specifications, the captured position and orientation of the actual race cars, and the data from each driving station 3.

Specifically, the simulation begins by initiating and synchronizing the actual race cars and the simulated, participant-operated race cars. Referring to FIG. 2, central computer 1 preferably initializes vehicle position and orientation of each actual race car as well as the lap counter. A time counter may be set to the desired time period during which the simulation is to run. Thereafter, a computer-generated image (CGI) of the actual race cars appearing on the simulated race track is presented to the participants and viewers. The starting positions and orientations of the participant-controlled, simulator race cars are then assigned using a prioritization algorithm, after which the CGI of the simulator race cars are presented with the actual race cars to the participants and the viewers.

Next, the simulation is incremented by one predetermined time interval. The position and orientation of each actual race car is updated according to the captured data of the recorded race stored in computer memory, or the captured data of the live race fed to central computer 1 in real-time. In addition, the position and orientation of each participant-controlled, simulator race car is updated based upon data generated by each participant via driving stations 3.

Central computer 1 then determines whether any of the simulator race cars has crashed. This determination may, for example, compare the updated location of the simulator race cars with each other and with the updated location of each actual race car, and, if any car locations overlap, a crash is found to have occurred. It is understood that other algorithms may be utilized to determine whether a simulator race car has crashed. If a participant-controlled, simulator race car is found to have crashed, the simulator car is removed from the remainder of the simulation.

If one or more participant-controlled, simulator race cars still remain in the simulated race, then central computer 1 presents to the participants and viewers an updated CGI of the actual and simulated race cars, with the locations of the race cars corresponding to their new, updated locations on the simulated race track.

Still referring to FIG. 2, central computer 1 may present statistics of the simulated race to the participants and viewers. The statistics may comprise statistics for each race car in the race, such as average speed, laps completed or remaining, etc. Alternatively, each participant may be provided only with those statistics pertaining to their simulated race car which an actual race car typically provides to its driver, such as fuel level, vehicle speed, etc.

Next, if the time counter has not yet elapsed and the race has not yet completed, central computer 1 increments the simulation by another predetermined time interval, updates the location of each race car, determines if any simulator race car has crashed, and outputs an updated CGI of the simulated race, as described above. These steps are repeated until all the simulator cars have crashed, the time counter has elapsed or the actual race ends.

The present invention may include a means for changing the performance of the actual race cars and or the simulated race cars to accommodate participants having little experience in operating a race car. For instance, the speed of the computer representation of the actual race cars may be selectively scaled, and the positions and orientations of the actual race cars and the size of the simulated race track may be alterable.

In order to provide a simulation which substantially resembles an actual automobile race, the present invention may include a means for providing audio from the live or recorded race to the participants and viewers.

The present system preferably provides a visual presentation of the simulated car race to the simulator participants and viewers. It is understood that the participants may engage in the simulation race and the viewers view the simulation presentation from remote locations relative to central computer 1. For instance, the central computer 1 may communicate with the viewers and with the participants over a wide area network, using a satellite, cable or internet medium.

Concerning the presentation of the simulated event, the central computer 1 preferably includes a means for providing a plurality of views of the simulated event to the participants and the viewers. The view providing means may provide a substantially unlimited number of views of the simulated event, such as a top plan view of the simulated race track, a view from any race car, a race official's view, a view from the pit area, etc.

Relatedly, the present invention may be utilized to merely view a computer representation of an actual race from a substantially unlimited number of views. In this configuration, the present simulator system would not use data provided by any simulator participant via the interface means. Instead, central computer 1 would only present the computer graphic representation of the actual race cars in the simulated environment to the simulator viewers.

The present invention may further include a means for allowing a simulator participant to take over the control of an actual race car at any point in the race. The take over means preferably interrupts captured data pertaining to an actual race car which would otherwise be supplied to central computer 1 and supplants the captured data with data supplied by a participant using a driver station 3.

In addition, the present invention may allow a participant to choose the desired type of race car from a variety of race car types. Central computer 1 may store data pertaining to a number of different race cars in its memory, including graphic data as well as performance data. When central computer 1 begins the simulation, the data corresponding to the race car chosen by a participant would then be accessed for inclusion in the simulation.

Although there have been described what are at present considered to be the preferred embodiments of the present invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than the foregoing description.

I claim:
1. An event simulator, comprising:
first means for generating a computer graphic representation of an environment in which a series of actual events occur;
second means for determining a position of one or more movable objects within the environment;
third means, responsive to said second means, for generating a computer graphic representation of said one or more movable objects at predetermined time intervals;
interface means for providing participant-supplied data representing movement of at least one participant in said computer graphic representation of the environment; and
computing means for presenting a computer graphical representation of the event based upon data provided by said environment generating means, said movable object generating means and said interface means.
2. The simulator of claim 1, wherein:
said second means determines the position of said one or more movable objects in real time; and
said third means generates a computer graphic representation of said one or more movable objects in real time.
3. The simulator of claim 1, wherein:
said third means places said computer graphic representation of said one or more movable objects within said computer graphic representation of the event.
4. The simulator of claim 1, wherein:
said third means places said computer graphic representation of said one or more movable objects within said computer graphic representation of the event based upon positioning of said one or more movable objects determined by said second means.
5. The simulator of claim 1, wherein:
said third means generates said computer graphic representations of said one or more movable objects based upon recorded positioning thereof previously determined and recorded by said second means.
6. The simulator of claim 1, wherein:
said second means further determines an orientation of said one or more movable objects within the environment; and
said third means generates said computer graphic representation of said one or more movable objects based upon said determined positioning and said determined orientation of said one or more movable objects within the environment.
7. The simulator of claim 1, wherein:
said computing means presents said graphical representation of the event to at least one individual located remotely from the event.
8. The simulator of claim 1, wherein:
said computer means presents a graphical representation of the at least one participant within said graphic representation of the environment.
9. The simulator of claim 1, wherein:
said third means generates a three dimensional computer graphic representation of said one or more movable objects.
10. The simulator of claim 1, wherein:
said computing means presents said computer graphical representation of the event as a visual display from any of a variety of views of said computer graphic representation of the environment.

11. The simulator of claim 10, wherein:
said computing means selectively presents said computer graphical representation of the event as a visual display from a top plan view thereof.

12. The simulator of claim 10, wherein:
said computing means selectively presents said computer graphical representation of the event as a visual display from a perspective of the at least one participant.

13. The simulator of claim 1, wherein:
said computing means includes a switching means for selectively switching positioning information relating to said computer graphic representation of one of said at least one movable objects from data provided by said second means to data provided by said interface means.

14. The simulator of claim 1, wherein:
the actual event comprises a motor vehicular race;
the environment comprises an area in which the motor vehicular race is performed;
said one or more movable objects comprises one or more motor vehicles participating in the motor vehicular race; and
said interface means provides said participant-supplied data representing a computer graphic representation of a participant-controlled motor vehicle in said computer graphical representation of the motor vehicular race.

15. A computer program product including a computer readable medium having computer readable program code means embodied thereon, for a system for simulating an event, said computer program product comprising:
first computer readable program code means for generating a computer simulation of an environment in which an event is to occur;
second computer readable program code means for receiving positioning information of at least one movable object participating in the event;
third computer readable program code means for receiving data from a system user relating to an operation of a simulated movable object for inclusion in the simulation of the event; and
fourth computer readable program code means, responsive to said first computer readable program code mans, said second computer readable program code means, and said third computer readable program code means, for presenting the event simulation having therein a computer simulation of the at least one movable object and said simulated movable object participating in said computer simulation of the environment.

16. The computer program product of claim 15, wherein:
said system presents said event simulation in real time relative to the performance of the event.

17. The computer program product of claim 15, wherein:
said second computer readable program code means receives information relating to the orientation of the at least one movable object, relative to the environment in which the event occurs; and
said fourth computer readable program code means presents said computer simulation of the at least one movable object within said computer simulation of the environment based upon said orientation information of the at least one movable object.

18. The computer program product of claim 15, wherein:
said fourth computer readable program code means presents said simulated movable object as a three dimensional object in said computer simulation of the environment.

19. The computer program product of claim 15, wherein:
said third computer readable program code means receives data from a system user relating to an operation of said computer simulation of the at least one movable object; and
said computer program product further includes fifth computer readable program code means for selectively switching said presentation of said computer simulation of the at least one movable object from being based upon said positioning information received by said second computer readable program code means to being based upon said data received by said third computer readable program code means.

20. The computer program product of claim 15, wherein:
said fourth computer readable program code means selectively presents the event simulation from any of a plurality of views relative to said computer simulation of the environment in which the event occurs.

21. The computer program product of claim 15, wherein:
said computer simulation of the at least one movable object comprises a computer simulation of a motor vehicle; and
said simulated movable object comprises a computer simulation of a motor vehicle.

22. The computer program product of claim 15, wherein:
said positioning information received by said second computer readable program code means includes scaleable parameters pertaining to said event simulation; and
said fourth computer readable program code includes a fifth computer readable program code means for selectively scaling said scaleable parameters pertaining to said event simulation, for varying said presentation thereof.

23. The computer program product of claim 15, wherein:
said fourth computer readable program code means presents statistical information relating to said event simulation.

24. A method of simulating an event occurring within an environment involving at least one movable object, said method comprising the steps of:
generating a computer simulation of the environment;
receiving positioning information of the at least one movable object;
generating a computer simulation of the at least one movable object;
receiving positioning information from a simulation participant relating to positioning thereof within said computer simulation of the environment;
generating a computer simulation of the participant; and
displaying said computer simulation of the environment having therein said computer simulation of the at least one movable object and said computer simulation of the simulation participant, based upon said positioning information of said at least one movable object and said positioning information of said simulation participant.

25. The method of claim 24, wherein:
said positioning information of the at least one movable object comprises positioning information recorded at predetermined intervals throughout the event; and
said displaying step comprises the step of incrementally displaying said computer simulation of the at least one movable object and said computer simulation of the simulation participant within said computer simulation of the environment.

26. The method of claim 24, wherein:
said displaying step displays said computer simulation of the environment having therein said computer simulation of the at least one movable object and said computer simulation of the simulation participant in real time, relative to the event simulated.

27. The method of claim 24, further including the step of:
determining if said computer simulation of the simulation participant cannot continue to participate in the event simulation.

28. The method of claim 27, further including the step of:
removing said computer simulation of the simulation participant from the event simulation, based upon said determining step.

29. The method of claim 24, wherein:
said displaying step selectively displays the event simulation from a plurality of views.

30. A computer program product for an event simulator having a processor, including instructions stored on a computer medium which, when executed by the processor, operate to:
generate a computer graphic representation of an environment in which a series of events occur;
receive positioning information of at least one movable object in the environment;
generate a computer graphic representation of the at least one movable object based upon the received positioning information thereof;
receive positioning information from a participant in the computer graphic representation of the environment based upon the received positioning information of the participant; and
display the computer representation of the at least one movable object and the computer representation of the participant in the computer representation of the environment.

31. The computer program product of claim 30, wherein:
the positioning information of the at least one movable object comprises positioning information recorded at predetermined intervals; and
the display of the computer representation of the at least one movable object and the computer representation of the participant in the computer representation of the environment is regularly updated.

32. The computer program product of claim 30, wherein:
display of the computer representation of the at least one movable object and the computer representation of the participant in the computer representation of the environment is updated in real time.

33. The computer program product of claim 30, wherein:
display of the computer representation of the at least one movable object and the computer representation of the participant in the computer representation of the environment is updated substantially in real time.

34. The computer program product of claim 30, further comprising instructions, which, when executed by the processor, causes the processor to:
determine if the participant can no longer participate in the event;
remove the computer representation of the participant from the computer representation of the environment; and
update the display of the computer representation of the at least one movable object in the computer representation of the environment based upon the removal of the computer representation of the participant.

35. The computer product of claim 30, wherein the at least one movable object is a motor vehicle.

* * * * *